July 24, 1956  G. A. SCHURMAN  2,756,406
VIBRATION DETECTOR

Filed Feb. 9, 1953  4 Sheets-Sheet 1

INVENTOR
GLENN A. SCHURMAN
BY
ATTORNEYS

July 24, 1956 G. A. SCHURMAN 2,756,406
VIBRATION DETECTOR

Filed Feb. 9, 1953 4 Sheets-Sheet 2

INVENTOR
GLENN A. SCHURMAN
BY
ATTORNEYS

July 24, 1956   G. A. SCHURMAN   2,756,406
VIBRATION DETECTOR

Filed Feb. 9, 1953   4 Sheets-Sheet 3

INVENTOR
GLENN A. SCHURMAN
BY
ATTORNEYS

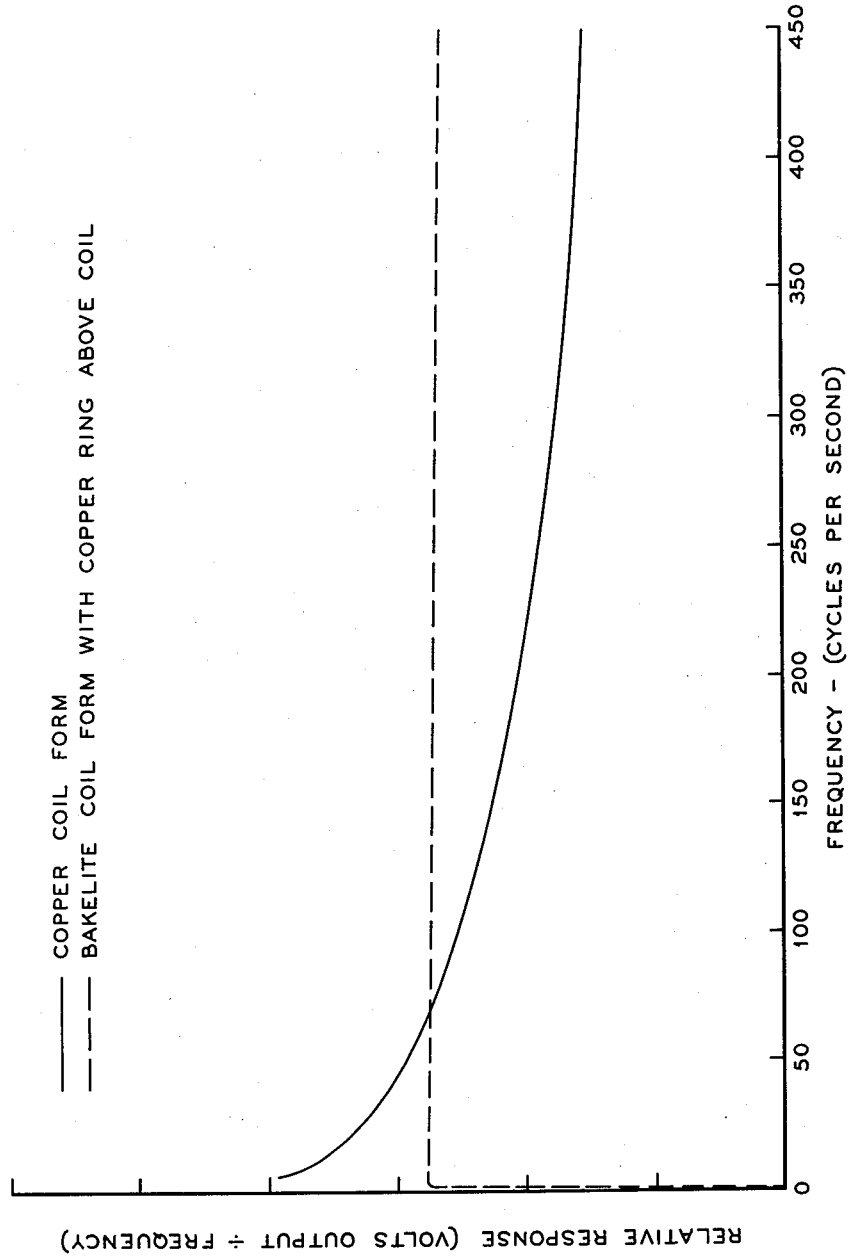

United States Patent Office 2,756,406
Patented July 24, 1956

2,756,406

VIBRATION DETECTOR

Glenn A. Schurman, Whittier, Calif., assignor to California Research Corporation, San Francisco, Calif., a corporation of Delaware Application February 9, 1953, Serial No. 335,669

5 Claims. (Cl. 340—17)

My invention relates to vibration detectors, and particularly to detectors for use in seismic surveying.

Seismic surveying may be employed to map the undulations of the subterranean strata. In such surveying, a charge of explosive is detonated, and vibrations resulting from the explosion are radiated into the earth, reflected from discontinuities between the various strata, and propagated back toward the surface where the vibrations are picked up at a number of points on or near the earth's surface. The instruments for detecting these vibrations are called geophones.

Prior art geophones, of which I am aware, employ an electromagnetic pickup system by which the energy of the vibrations is used to generate a current which is amplified, recorded and analyzed to extract its useful information. In form, they consist of a permanent magnet and a coil of wire. Movement of the coil relative to the field of the permanent magnet generates an alternating current characteristic of the disturbance which moves the geophone. The permanent magnet is a heavy metal member which is affixed to the case of the geophone. The coil, a lighter member, is suspended by a spring in the field of the magnet. When the earth below the geophone moves as a result of a seismic disturbance, a portion of this motion is transferred to the case and the permanent magnet, causing them to move relative to the coil, generating a current in the coil.

It has been found that such a geophone placed on the earth is not wholly satisfactory since its response is frequency sensitive, indicating an adverse geophone-earth resonance characteristic within the range of the useful frequencies of vibrations generated by the seismic disturbance.

Accordingly, it is an object of my invention to provide a geophone which, in combination with the earth, has a resonant frequency outside of the range of frequencies which it is to pick up.

It is a further object of my invention to provide a geophone which has characteristics of a light instrument as regards the resonant frequency of the geophone ground system.

It is a further object of my invention to provide a geophone which has a relatively flat frequency response over the range of signals it is designed to detect.

It is yet another object of my invention to provide a geophone which is capable of detecting low energy vibrations.

It is yet another object of my invention to provide a geophone having the static characteristics of a heavy geophone and the dynamic characteristics of a light geophone.

It is a further object of my invention to provide a geophone in which the heavy permanent magnet is not required to move in response to earth vibrations while the lighter elements follow the motion of the earth.

In accordance with my invention, I provide a geophone having a light but rugged casing to which is rigidly affixed a light coil of wire. A relatively heavy magnet is resiliently mounted on the case and disposed in such a position that its magnetic field will pass through the windings of the coil. The heavy magnet causes the geophone to seat firmly on the earth. A seismic vibration incident on the geophone moves only the case and the coil while the magnet remains stationary. The relative movement between the coil and the magnet produces a current which is a measure of the amplitude of the vibration incident on the geophone. The vibration therefore moves only the light elements of the geophone while the seating contact between the geophone and the earth is determined by the total weight of the geophone. The total weight of the geophone, however, is determined largely by the weight of the heavy magnet and pole structure.

The novel features of my invention are set forth with more particularity in the accompanying claims. The invention itself, however, with respect to the details thereof, together with its additional objects and advantages which will become apparent as the description proceeds, may be better understood from the following description of a specific exemplary embodiment with reference to the accompanying drawings, in which:

Fig. 6 is a graph of the relative response of a geophone whose case is vibrated with a constant amplitude.

Figure 1:
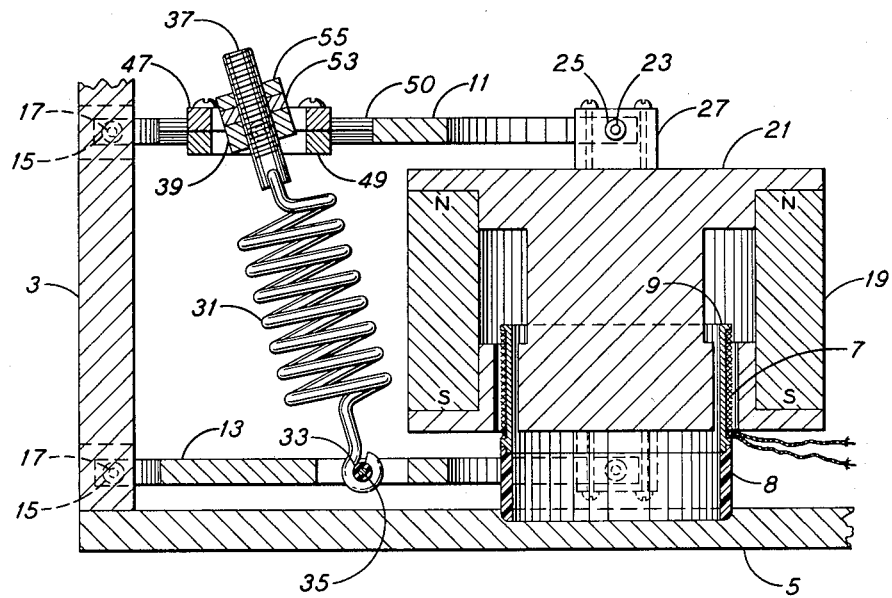
Fig. 1 is a vertical cross-sectional view of a geophone according to my invention.

Reference is called to Fig. 1 for a more complete understanding of my invention. This figure illustrates portions of side 3 and bottom 5 of the geophone case. A coil 7 is wound around a light cylindrical core 9 which is attached to a plastic member 8 which is rigidly affixed to the base 5 of the geophone. I prefer to use a copper core for the coil since the high conductivity of the copper causes it to have an adequate damping effect on its own motion relative to the permanent magnet. Two parallel arms 11 and 13, having bifurcated ends, are pivotally attached at one end to the wall 3 by means of pins 17 which seat in rubber bushings 15 secured in recesses in the arms 11 and 13 and the wall 3. The rubber bushings provide an elastic-low hysteresis bearing and thereby eliminate static friction from the parallelogram linkage. The other ends of the parallel arms have pivotally mounted on them a cylindrical permanent magnet 19 which is secured to a massive ferromagnetic core 21. The poles of the magnet are at its upper and lower ends as shown in Fig. 1. The magnet-core assembly is supported at the top and bottom by pins 23, which extend inwardly from the bifurcated ends of the arms 11 and 13 and are seated in rubber bushings 25 which are secured to the lugs 27 projecting from the uppermost and the lowermost faces of the magnet-core assembly. Parallel arms 11 and 13 then are free to rotate about the pins 17, and the magnet-core assembly 21 is constrained by the arms 11 and 13 to move in a line parallel to the wall 3. A spring 31 is supported at one end by a rubber bushing 33, around a pin 35, the pin 35 being stationary with respect to the arm 13. At its other end, the spring 31 is attached to a threaded screw 37. Fitting loosely over the screw 37 is an element 39 having pins 41 affixed thereto. Rubber bushings 43 surround the end portions of the pins 41. The rubber bushings rest in recesses between two parallel plates 47 and 49 held in contact by screws 45.

The rectangular plates 47 and 49, when in contact, have their outer edges beveled to form two V-shaped grooves 46. The arm 11 has a rectangular recess 50 with correspondingly beveled edges 51 so dimensioned that the plates 47 and 49 can be adjusted to slide therein with respect to the pivotal support for the upper arm 11. The two edges 51 are such that they fit within the V-shaped grooves formed between the plates 47 and 49. When the screws 45 are loosened, the plates 47 and 49 can slide freely in the recess within the arm 11. When the screws 45 are tightened, they bind the plates 47 and 49 into one position relative to arm 11.

A positioning nut 53 and lock nut 55 are screwed onto the adjusting screw 37. Thus it is seen that the tension on the spring 31 tending to support the heavy weight assembly may be varied by moving the position of the nut 53 on screw 37, extending and relaxing the spring 31.

The lateral position of the pin 41 relative to the pivoted connection between the upper arm 11 and the wall 3 determine the direction in which the spring 31 exerts its force. The position of the pin 41 may be varied by loosening the screws 45 and moving the plates 47 and 49 within the recess 50 in the arm 11. In any position which the plates 47 and 49 can take within the slot, the pin 41 will be nearer to the wall 3 than the pin 35. The spring exerts an upward force on the pin 35 and a downward force of equal magnitude on the pin 41. Since the force on pin 35 has a longer lever arm about the lower pin 17 than the force on 41 has about the upper pin 17, the spring 31 exerts a torque tending to support the weight of the arms 11 and 13, the core 21, and magnet 19. The position of the plates 47 and 49 and the tension on the spring are so arranged that the arms 11 and 13 are maintained horizontal when no external force is exerted on the geophone.

In operation, the geophone is placed on the ground, and an explosive is detonated at a distance from it. The case of the geophone is in contact with the earth at points on the bottom 5 and moves in response to vibrations of the earth. The light coil 7 and core 9 move with the geophone case. The core and magnet assembly suspended from the arms 11 and 13 have a substantial amount of inertia and tend to remain stationary. The case then moves relative to the core 21 and magnet 19, and current is generated in the coil 7. The case of the geophone is made as light as possible, as is the coil assembly 7 and 9. The earth vibrations then cause movement only of the lighter elements of the geophone and permit the massive elements to remain stationary during the length of time that the desired seismic reflections are being received. The geophone then is dynamically light, and little energy is required to cause the desired signal currents to flow in the coil 7.

It has been found that when a geophone is placed on the surface of the earth, the geophone case-earth system is resonant and has a characteristic resonant frequency which is a function of the weight of the geophone, the base area of the geophone, and the elastic constants of the near-surface material.

Figure 3:
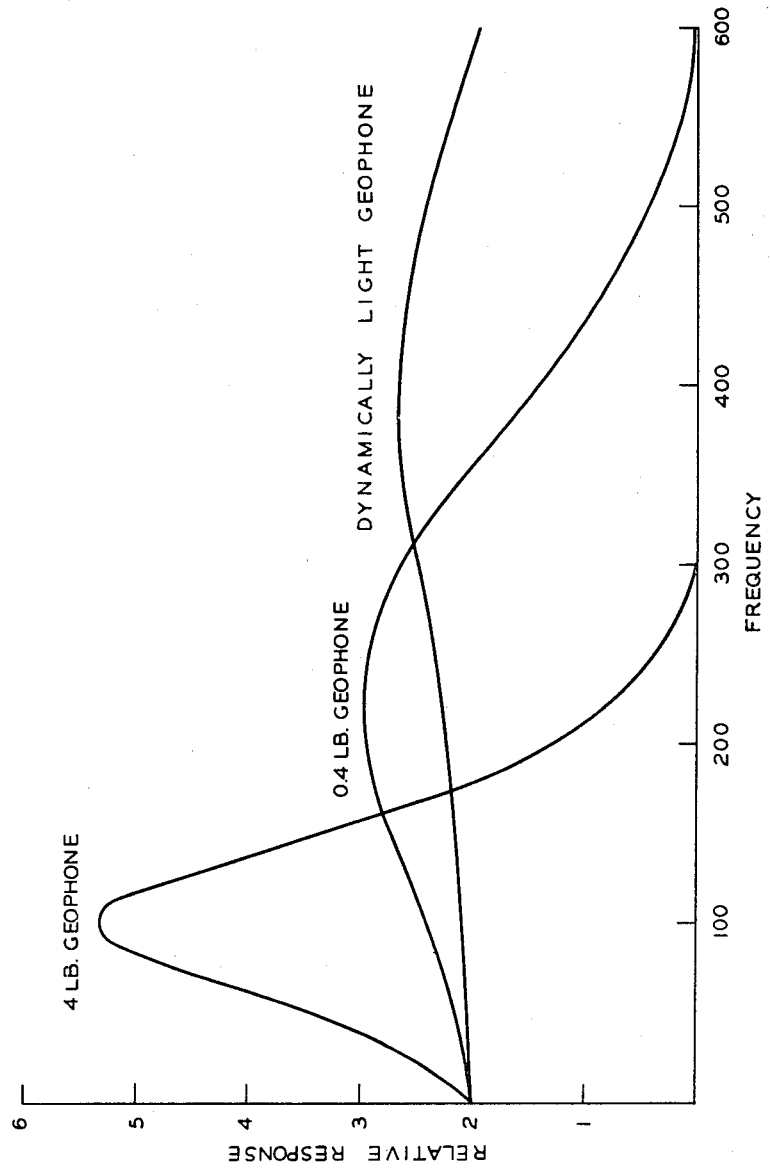
Fig. 3 is a representation of the overall response of three types of geophones resting on an average surface material.

I have obtained data which indicate that three representative geophones respond according to the curves in Fig. 3 when placed on the earth and subjected to vibration from an explosion. A conventional 4-pound geophone has a narrow resonance peak in the region of 100 cycles. A 0.4-pound geophone has a broad resonance peak at between 200 and 300 cycles; whereas, a dynamically light geophone according to my invention has a broad resonance peak between 300 and 500 cycles and shows no appreciable drop in sensitivity up to 600 cycles. A 4-pound conventional geophone exhibits practically no response at 300 cycles, and a 0.4-pound geophone has greatly reduced response characteristics at points beyond 400 cycles.

Figure 5:
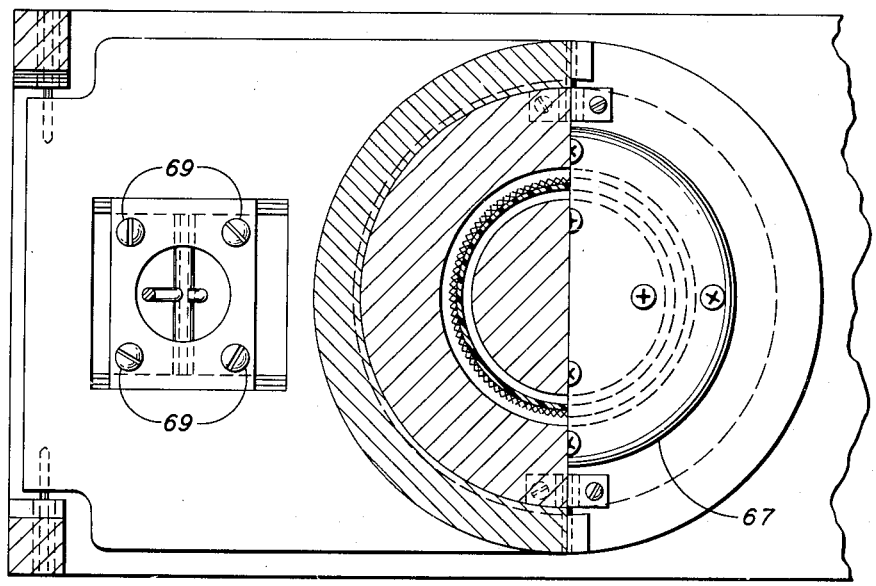
Fig. 5 is a sectional view of the geophone shown in Fig. 4.
Figure 4:
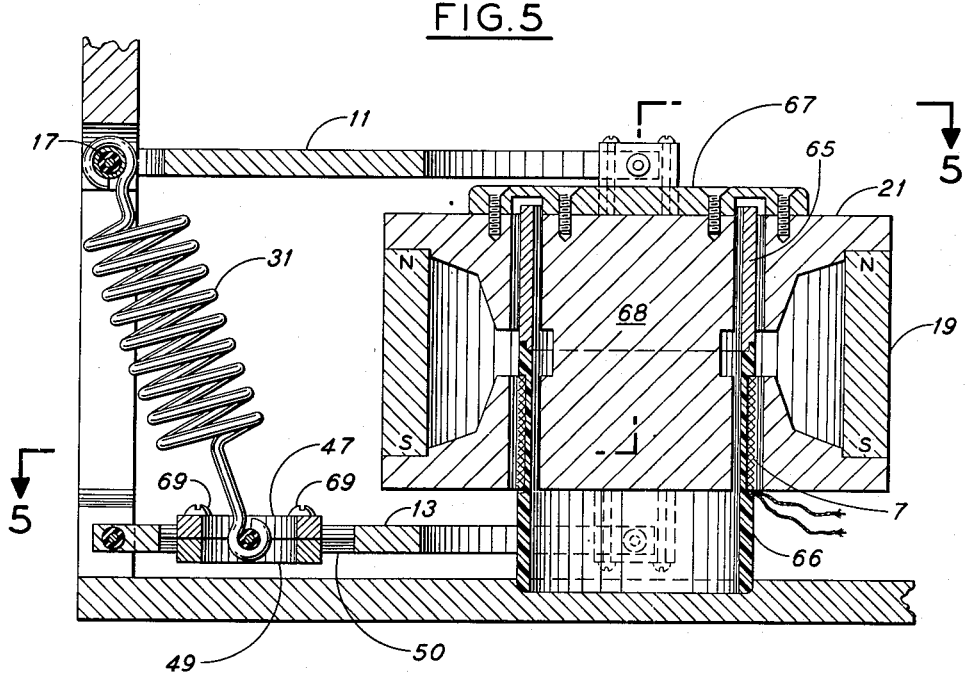
Fig. 4 is a plan view of a geophone according to my invention.

An alternative embodiment of my invention is shown in Figs. 4 and 5. The geophone shown in these figures differs from the one previously described primarily in that the copper damping cylinder used as a core for the coil 7 in the embodiment shown in Fig. 1 becomes the damping cylinder 65 in Fig. 4 and is separated from the coil 7. The coil 7 is wound on the bakelite core form 66 and is located within the field of the magnet 19. Other light weight nonconductive materials may be used for the coil form 66. The copper cylinder 65 is also within the field of the magnet 19 and is supported by an upper projection on the coil form 66. In order for the full desired damping effect to be derived from the cylinder 65, it may be so dimensioned that it protrudes from the upper edge of the magnetic air gap. A nonmagnetic bridge 67 is used to connect the magnet 19 and core 21 to the inner part of the core. Any nonmagnetic material of sufficient strength may be employed for the bridge 67, such as aluminum. With the arrangement shown in Figs. 4 and 5 it has been found desirable at times to fabricate the central pole 68 from a magnet material such as that used in 19.

I have found that when the cylinder 65 and coil 7 are in close juxtaposition the eddy currents generated in the copper cylinder 65 at times tend to affect the signal generated in the coil 7. Accordingly, in the present embodiment the damping cylinder 65 is spaced a distance from the coil 7, and the transformer effect which may produce interaction between the elements 7 and 65 is minimized.

In the geophone shown in Figs. 4 and 5 the spring 31 is hinged between the pin 17, which supports one horizontal arm 11 and a movable member 47—49 on the lower arm 13. The movable member 47—49 consists of an upper plate 47 and a lower plate 49 which are bound together by screws 69. The screws 69 may be loosened and the member 47—49 positioned at the desired point within the grooved opening 50. When the screws 69 are later tightened, the position of the ends of the spring 31 is established. I have found that under conditions in which the geophone is desired to have a minimum frequency of resonance it is desirable that the spring 31 be as long as possible. This effect is achieved within the size limitations of the present geophone by attaching one end of the spring 31 to the member 17 at one wall of the geophone. Then the member 47—49 is appropriately positioned to center the coil 7 and copper cylinder 65 within the field of the magnet 19.

Fig. 6 is a graph of relative response versus frequency. The relative response is obtained by dividing voltage output of the coil 7 for constant use displacement by the frequency of the impressed vibration. If the graph were a straight line parallel to the frequency axis, it would represent a situation in which the voltage output was directly proportional to the velocity of the coil 7 relative to the magnet 19. The dotted line in the graph represents the response of the geophone shown in Figs. 4 and 5 of the drawing. The solid line shows the response of the geophone shown in Figs. 1 and 2 of the drawing. The graph shows that the relative response of the geophone is more nearly independent of the impressed frequency when the copper cylinder 65 is separated from the coil 7. This improved relationship is apparent from the fact that the dotted line is more nearly horizontal than the solid line.

Figure 2:
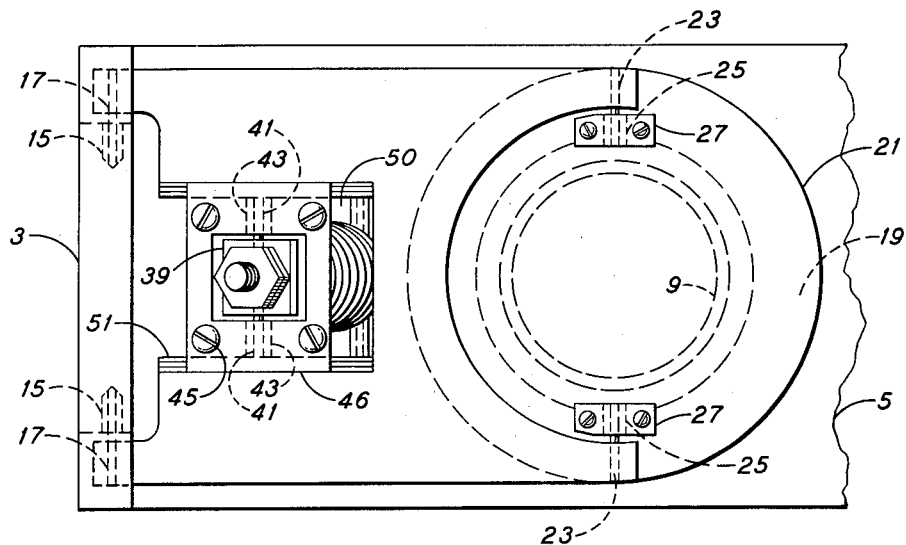
Fig. 2 is a plan view of the geophone shown in Fig. 1.

Geophones generally are of such a nature that they have a natural or resonant frequency at which they tend to vibrate in response to any external force. It is desired, however, to cause geophones to deliver a signal substantially the same as the motion impressed on them. To achieve this result, then, the geophone is damped so that there is very little tendency toward sustained vibration as a result of one forced motion. They are usually damped at 0.6 to 0.7 of their critical damping constant. The present geophone is damped electrically as a result of the eddy currents generated in the core 9 of the coil 7 as shown in Figs. 1 and 2 or in the copper ring 65 shown in Fig. 4 and by the shut effect of the instrumentation with which the geophone is coupled.

In prior art geophones of which I am aware the core and permanent magnet are among the moving elements, while the pickup coil and its core are stationary. Accordingly, the weight of the coil and coil core are unimportant to the design of the apparatus and may be so dimensioned that they provide any desired degree of damping.

In the present invention, however, it is important that the coil 7 and its core 9 be as light as possible, thus decreasing the amount of electromagnetic damping which is available. The amount of damping required is set forth in the equation $$C_c = 2m\omega_n \quad (1)$$

where:

$C_c$=the critical damping constant, a measure of the damping force required
$m$=the mass of the moving weight
$\omega_n$=the natural angular frequency of the suspension.

In Equation 1, the mass $m$ is the mass of the core 21, magnet 19 and associated parts. From the equation, then, it is seen that the critical damping constant $C_c$ will tend to be large compared to conventional geophones since the mass is large. It is important, then, that $\omega$ be reduced as much as possible to decrease the damping force required. As much damping as is possible is provided by the core 9 of the coil 7 in Figs. 1 and 2 or in the ring 65 in Figs. 4 and 5 and the instrumentation shunt. The coil may be formed from copper in order to provide a high conductivity material, encouraging electromagnetic damping.

It is known that for given components weights the external force required to give the geophone case a predetermined motion is proportional to the natural frequency of the geophone suspension. Therefore, the effective sensitivity, other factors being constant, of the geophone is improved if its resonant frequency is decreased. The positioning of the spring 31 is adapted to decrease the natural frequency of oscillation of $\omega_n$. In a system in which a weight is suspended from a spring, the following equation holds:

$$f_{nat} = \frac{3.13}{\sqrt{\delta}} \quad (2)$$

where $f_{nat}$ is the natural frequency, and $\delta$ (in inches) is the static sag or displacement from the rest of the spring when the weight is stationary and subject to no external force. It follows from this equation that if the natural frequency is to be decreased, the sag must be increased. In geophones, however, it has been found that a long spring is not completely satisfactory, because it results in a geophone which is large and therefore clumsy to use and more subject to actuation by sources of spurious signals, such as vibration due to wind. For example, the effect of the wind on the geophone is dependent upon the cross-sectional area of the geophone, and hence if a geophone is increased in size with the corresponding increase in cross-sectional area, disturbance from the wind will be aggravated.

Accordingly, I have provided an arrangement in which the effective sag is such that low natural frequency is provided while the actual elongation of the spring is small.

Referring to Fig. 1, which illustrates this characteristic, let $L_1$ be the distance between the pin 41 on arm 11 and the pin 17 in wall 3,
let $L_2$ be the distance between the pin 35 in arm 13 and the pin 17 in wall 3,
let $D$ be the distance between the pin 17 in wall 3 and the pin 25 in arm 11,
let $\delta_s$ be the deflection of the spring 31,
let $\delta$ be the effective static deflection of the mass 19 and 21.

Then, for the arrangement shown in Fig. 1, $$\delta = \delta_s \left( \frac{D}{L_2 - L_1} \right) \quad (3)$$

From Equation 3, it is seen that a large effective static displacement is obtained with a reasonable spring deflection. For a given spring, $\delta_s$ is a function of the position of the blocks 47 and 49 in the slot of arm 11, i. e., a function of $L_2-L_1$. $L_2-L_1$ may be decreased, decreasing the natural frequency by moving the plates 47 and 49 farther from the wall 3. The position of nut 53 on the cylinder 37 is varied to afford sufficient tension on the spring 31 to hold the arms 11 and 13 horizontal.

In a geophone according to the present invention, the spring 31 must be stiffer than if it were placed directly above the pole piece 21. Several advantages arise from the use of a stiffer spring and the placement of the spring between the arms 11 and 13. The spring 31 is less likely to have internal resonances in the frequency range at which the geophone is intended to operate. The arrangement provides a geophone having a low natural frequency without unduly increasing the size of the geophone. The spring 31 is placed within the instrument, using a minimum of space, and it may be short since its sag $\delta_s$ may be small.

It is apparent, then, that I have provided a geophone which, when coacting with the earth, has a relatively flat frequency response since its earth-geophone resonant frequency is outside of the frequency range for which it is to be used. A minimum of energy is required to actuate it because it is dynamically light, and it has a small enough cross-section to maintain within reasonable limits the objectionable effects of the wind.

Although I have shown and described a preferred embodiment of my invention, I realize that many modifications thereof are possible without departing from the spirit and scope of the invention. I do not intend, therefore, to limit my invention to the specific embodiment described herein, but to embrace all equivalents within the limits of the appended claims.

I claim:

1. An instrument for sensing vibrations comprising a coil affixed to support means adapted to move in accordance with said vibrations, a magnet connected to two rigid parallel arms, a pivotal connection between said parallel arms and said support means, resilient tension means connected between said arms, the connections between said arms and said tension means being so arranged that a torque is created to maintain said magnet in a predetermined static juxtaposition to said coil, and means for adjusting the tension of said tension means and the position of said connections.

2. A geophone comprising a rigid base member adapted to be placed in contact with the surface of the earth, a side member rigidly attached to said base member and extending substantially vertically at a right angle thereto, a first rigid lever member having one end pivotally mounted on said side member and extending from said side member in a position over and substantially parallel to said base, a second rigid lever member having one end pivotally mounted on said side member and extending therefrom in the same direction as and substantially parallel to said first lever member, a substantially vertical rigid element pivotally connected to and between the ends of the said rigid lever members opposite from the ends thereof pivotally mounted on said side member, said rigid element being positioned axially of a hollow cylindrical coil rigidly attached to said base member, a cylindrical magnet mounted on said rigid element and disposed circumferentially of and spaced apart from said coil, a core of ferromagnetic material rigidly attached to said rigid element and said magnet, said core having a cylindrical portion disposed within said hollow coil in axial relationship and spaced apart therefrom in a radial direction, a cylinder of electrically conductive material disposed between said core and said coil in radially spaced relationship to said core, a tension spring connected between said lever members in a position between the ends thereof, said spring having one end thereof pivotally mounted on a fixed pivot on one of said lever members, the other end of said spring being adjustably mounted on the other of said lever members for adjustment toward and away from said side member, and means to adjust the tension of said spring.

3. A geophone comprising a rigid base member, a side member rigidly attached to said base member, a first rigid lever member having one end pivotally mounted on said side member and extending from said side member in a position over and substantially parallel to said base; a second rigid lever member having one end pivotally mounted on said side member and extending therefrom in the same direction as and substantially parallel to said first lever member, a magnet and cylindrical ferromagnetic core pivotally connected to and between the ends of said rigid lever members opposite from the ends thereof pivotally mounted on said side members, said magnet and ferromagnetic core being positioned axially of a hollow cylindrical coil rigidly attached to said base member, said core being disposed within said hollow coil in axial relationship and spaced apart therefrom in a radial direction, said magnet having a portion disposed outside said hollow coil and being spaced therefrom in a radial direction, a tension spring connected between said lever members, said spring having one end thereof pivotally mounted on a fixed pivot on one of said lever members, the other end of said spring being adjustably mounted on the other of said lever members for adjustment toward and away from said side member, and means to adjust the tension of said spring.

4. An instrument for sensing vibrations comprising a coil affixed to support means adapted to move in accordance with said vibrations, a magnet connected to two rigid parallel arms, a pivotal connection between said parallel arms and said support means, resilient tension means connected between said arms, the connections between said arms and said tension means being so arranged that a torque is created to maintain said magnet in a predetermined static juxtaposition to said coil, and means for adjusting the tension of said tension means.

5. A geophone comprising a rigid base member adapted to be placed horizontally in contact with the earth, a side member rigidly attached to said base member and extending substantially vertically, a first rigid lever member having one end pivotally mounted on said side member and extending from said side member in a position over and substantially parallel to said base, a second rigid lever member having one end pivotally mounted on said side member and extending therefrom in the same direction as, and substantially parallel to said first lever member, a substantially vertical member pivotally connected to and between the ends of said rigid lever members opposite from the ends thereof pivotally mounted on said side member, said rigid element being positioned axially of a hollow cylindrical coil rigidly attached to said base member, a magnet mounted on said rigid element and disposed to send magnetic flux through a ferromagnetic core affixed to said rigid member and through said coil, said core having a portion disposed within said hollow coil in axial relationship and spaced apart therefrom in a radial direction, a tension spring connected between said lever members in a position between the ends thereof, said tension spring being adapted to maintain said lever members substantially horizontal when said geophone is stationary and to permit movement of said lever members when said geophone is subjected to an acceleration.

References Cited in the file of this patent
UNITED STATES PATENTS

| | | |
|---|---|---|
| 2,013,993 | Sauls | Sept. 10, 1935 |
| 2,038,101 | Dudley | April 21, 1936 |
| 2,062,784 | Green | Dec. 1, 1936 |
| 2,074,043 | Blau et al. | Mar. 16, 1937 |
| 2,130,213 | Wolf et al. | Sept. 13, 1938 |
| 2,271,864 | Honnell et al. | Feb. 3, 1942 |
| 2,272,984 | Ritzmann | Feb. 10, 1942 |
| 2,304,738 | McCarty | Dec. 8, 1942 |
| 2,307,792 | Hoover | Jan. 12, 1943 |
| 2,348,225 | Petty | May 9, 1944 |
| 2,371,973 | Minton | Mar. 20, 1945 |
| 2,372,056 | Broding | Mar. 20, 1945 |
| 2,387,223 | Carson | Oct. 16, 1945 |
| 2,636,160 | Loper | Apr. 21, 1953 |